June 15, 1937.    T. O. DUNKERKE    2,084,134
TWINE PACKAGE
Filed Sept. 18, 1936
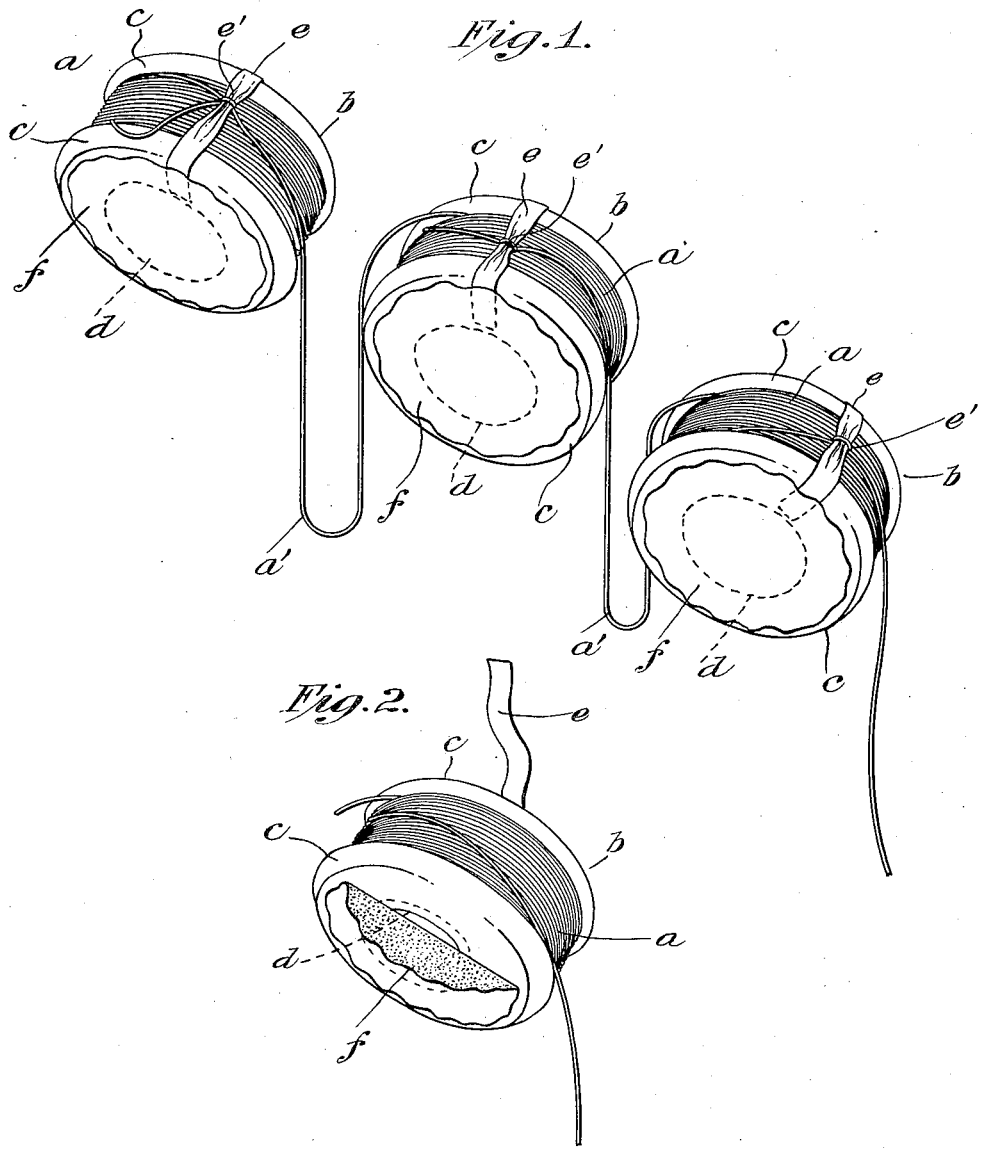

Patented June 15, 1937

2,084,134

UNITED STATES PATENT OFFICE 2,084,134

TWINE PACKAGE

Thomas O. Dunkerke, Farmingdale, N. Y.

Application September 18, 1936, Serial No. 101,359

2 Claims. (Cl. 242—161)

In the packaging of twine, such as fish line and twine intended for other purposes, it is common to spool or reel the twine on a succession of carriers, such as spools, or reels, or tubes, the twine being carried from the outer layer on each spool, as the spool is filled, to the core of the next spool in succession and so on for as many spools as are necessary to provide the desired continuous length of fish line or otherwise. In the process of spooling a length of twine which requires two or more spools, provision must be made for preventing the accidental unwinding of the twine from any spool in order to guard against entanglement, and various expedients have been resorted to in the past for securing the twine to each spool, but such expendients have not proved altogether satisfactory. It has therefore been the purpose of the present invention to provide for such securing of the twine to each spool as it is filled as shall prevent the possibility of loosening the twine on any spool and therefore prevent the possibility of entanglement.

In accordance with the invention, there is provided for each spool as it is filled a fastening strip, preferably of fabric, which is applied to the spool as it is filled, one or more turns of the twine being taken about the fastening strip before or after it is secured at both ends, as by adhesive or other suitable means, to the flanges of the spool, or it might be to the body of the carrier tube.

The invention will be more fully explained hereinafter with reference to the accompanying drawing in which Figure 1 is a view in perspective showing three filled spools with a slack portion of twine between consecutive spools, each of which has applied thereto a suitable fastening strip; and Figure 2 is a view in perspective of a single filled spool with one end of the fastening strip unattached to the spool in readiness to receive a turn of the twine, as shown, and with the gummed label turned back in readiness to be applied to the spool to secure the end of the fastening strip.

In the drawing, which serves as an illustration of an embodiment of the invention, the twine indicated at $a$ is shown as wound upon twine carriers $b$, which might be spools, or reels, or tubes, and are shown as wooden spools having flanges $c$ and a core $d$ represented by a dotted line.

As each twine carrier is filled with the required length of twine, the twine of the outermost layer is continued as by a slack portion $a'$ and the winding is continued on the core of the next spool until that spool also contains a required length.

There is provided for each spool a fastening strip $e$ which may be of any suitable material, but preferably of a suitable fabric, one end of which is secured to the carrier by any suitable means as by a gummed label on the reverse end of the twine carrier. Such gummed label or other suitable securing means is not necessary to be shown in the drawing, being assumed in this instance to be generally similar to the label $f$ shown on the end of the spool nearest the eye of the observer. When one end or both ends of the fastening strip has been secured to the carrier, one or more turns of the twine is taken about the fastening strip, as shown at $e'$, and the free end of the fastening strip is then secured to the twine carrier, as by the usual gummed label $f$ which may be moistened and pressed down upon the spool and the end of the fastening strip. In like manner, the twine after being secured by the fastening strip, may be carried to the next spool in succession until the required length of twine is wound upon the requisite number of spools or other carriers.

I claim as my invention:

1. As a new article of manufacture, a twine package comprising a plurality of twine carriers, a length of twine wound on successive carriers leading from the outer layer of a carrier to the core of a succeeding carrier, and a fastening strip of fabric about which a turn of the twine from the outermost layer is taken, the ends of the fastening strip being secured to the carrier.

2. As a new article of manufacture, a twine package comprising a plurality of spools, a length of twine wound on successive spools leading from the outer layer of a spool to the core of a succeeding spool, a fastening strip of fabric laid across the flanges of the spool and about which a turn of the twine from the outermost layer is taken, and means to secure the ends of the fastening strip to the spool.

THOMAS O. DUNKERKE.